United States Patent
Farhan et al.

(10) Patent No.: US 9,251,027 B2
(45) Date of Patent: Feb. 2, 2016

(54) INFORMATION HANDLING SYSTEM PERFORMANCE OPTIMIZATION SYSTEM

(75) Inventors: Munif Farhan, Round Rock, TX (US); William Sauber, Georgetown, TX (US)

(73) Assignee: Dell Productes L.P., Round Rock, TX (US)

( * ) Notice: Subject to any disclaimer, the term of this patent is extended or adjusted under 35 U.S.C. 154(b) by 835 days.

(21) Appl. No.: 13/411,911

(22) Filed: Mar. 5, 2012

(65) Prior Publication Data

US 2013/0232331 A1    Sep. 5, 2013

(51) Int. Cl.
*G06F 11/00* (2006.01)
*G06F 9/00* (2006.01)
*G06F 11/32* (2006.01)
*G06F 11/30* (2006.01)
*G06F 11/34* (2006.01)

(52) U.S. Cl.
CPC .......... *G06F 11/328* (2013.01); *G06F 11/3006* (2013.01); *G06F 11/3093* (2013.01); *G06F 11/3409* (2013.01)

(58) Field of Classification Search
CPC .............. G06F 11/328; G06F 11/3006; G06F 11/3093; G06F 11/3409
See application file for complete search history.

(56) References Cited

U.S. PATENT DOCUMENTS

| | | | |
|---|---|---|---|
| 7,418,608 B2* | 8/2008 | Kumar et al. | 713/320 |
| 7,707,443 B2* | 4/2010 | Chheda et al. | 713/322 |
| 7,925,911 B2* | 4/2011 | Brey et al. | 713/340 |
| 8,140,869 B2* | 3/2012 | Song et al. | 713/300 |
| 8,381,215 B2* | 2/2013 | Johnson et al. | 718/102 |
| 2005/0015632 A1* | 1/2005 | Chheda et al. | 713/300 |
| 2007/0067656 A1* | 3/2007 | Ranganathan et al. | 713/320 |
| 2009/0089782 A1* | 4/2009 | Johnson et al. | 718/100 |
| 2009/0210726 A1* | 8/2009 | Song et al. | 713/300 |

* cited by examiner

Primary Examiner — M Elamin
(74) Attorney, Agent, or Firm — Haynes and Boone, LLP (57) ABSTRACT

A performance optimization system includes a plurality of system components. A monitoring plug-in and a configuration plug-in are coupled to each of the plurality of system components. A monitoring engine receives monitoring information for each of the plurality of system components from their respective monitoring plug-in. A configuration engine sends configuration setting information to each of the plurality of system components through their respective configuration plug-ins. A performance optimization engine receives the monitoring information from the monitoring engine, determines a policy associated with the monitoring information and, in response, retrieves configuration setting information that is associated with the policy and sends the configuration setting information to the configuration engine in order to change the configuration of at least one of the plurality of system components.

20 Claims, 6 Drawing Sheets

INFORMATION HANDLING SYSTEM PERFORMANCE OPTIMIZATION SYSTEM

BACKGROUND

The present disclosure relates generally to information handling systems (IHSs), and more particularly to the optimization of the performance of IHSs.

As the value and use of information continues to increase, individuals and businesses seek additional ways to process and store information. One option is an IHS. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs include a number of IHS components that operate together in order to perform tasks instructed by the IHS user. The optimization of the operation of the IHS and IHS components is desirable, as when an IHS operates at a less than optimal performance level, the IHS user may interpret the IHS operation as being due to the IHS being inferior relative to other IHSs. Conventional systems tend to provide the IHS with performance settings such that the IHS and IHS components operate well in the majority of the situations that the IHS will be used in. However, such conventional solutions do not really provide "optimized" performance, as the IHS and IHS components will likely never actually operate optimally in any particular situation. Some specific-use conventional systems such as, for example, gaming systems, may attempt to optimize the IHS component configuration and/or software code for the use the IHS is provided for (e.g., gaming), which limits the optimized performance of the system to its predetermined specific use. Other conventional systems may monitor the system use with regard to the system settings and make recommendations to the IHS user concerning the system settings, which provides for a system-based optimization that ignores the fact that different users and different applications may effect system operation such that performance is no longer optimized, while also requiring user intervention to implement the recommended settings Accordingly, it would be desirable to provide an improved performance optimization system for an IHS.

SUMMARY

According to one embodiment, a performance optimization system includes a plurality of system components (e.g., hardware components, software components, firmware drivers, an operation system, applications, and/or a variety of other system components known in the art), a monitoring plug-in and a configuration plug-in coupled to each of the plurality of system components, a monitoring engine coupled to each monitoring plug-in, wherein the monitoring engine is operable to receive monitoring information for each of the plurality of system components from the monitoring plug-ins, a configuration engine coupled to each configuration plug-in, wherein the configuration engine is operable to send configuration setting information to each of the plurality of system components through the configuration plug-ins; and a performance optimization engine coupled to the monitoring engine and the configuration engine, wherein the performance optimization engine is operable to receive the monitoring information from the monitoring engine, determine a policy is associated with the monitoring information and, in response, retrieve configuration setting information that is associated with the policy and send the configuration setting information to the configuration engine in order to change the configuration of at least one of the plurality of system components.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
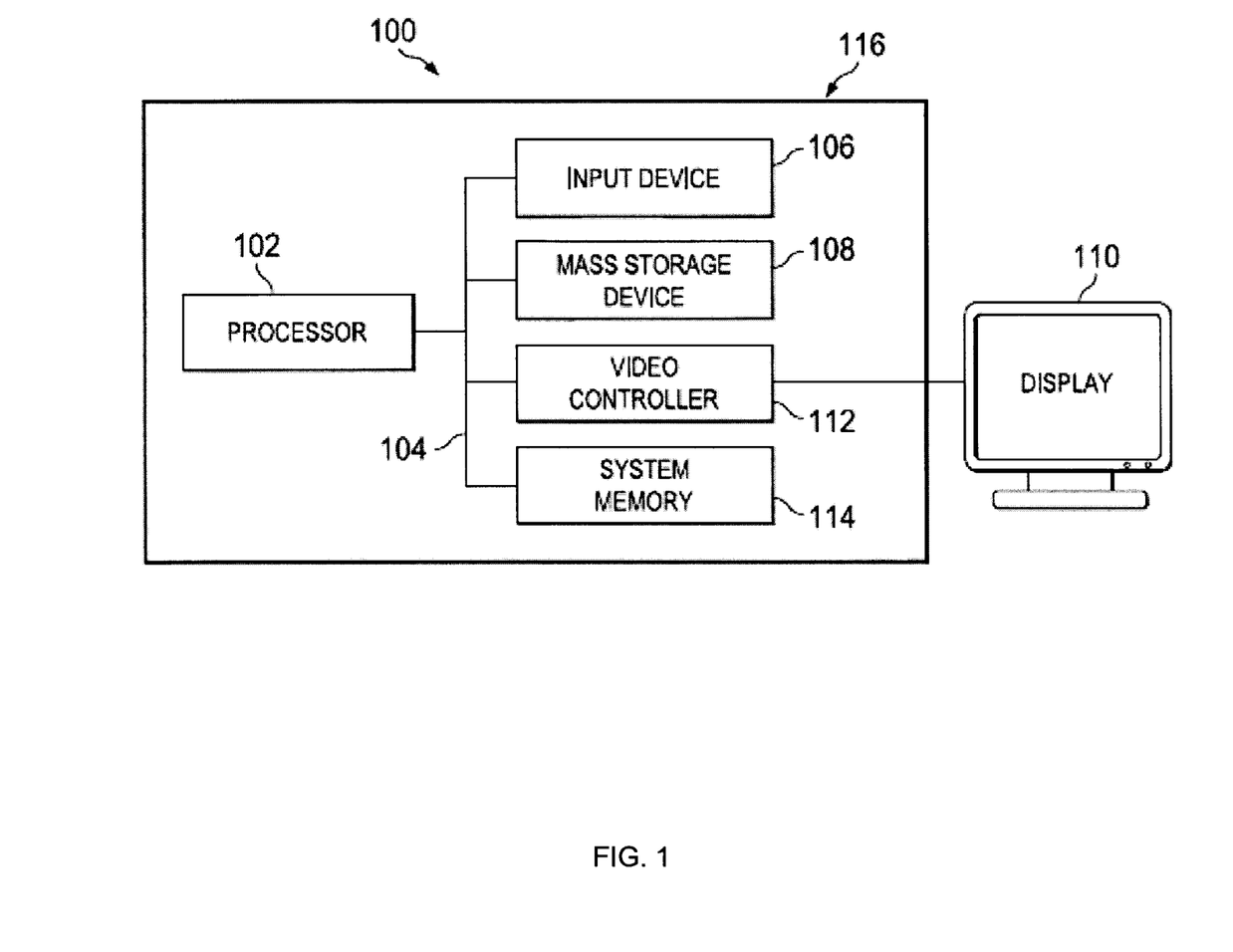
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
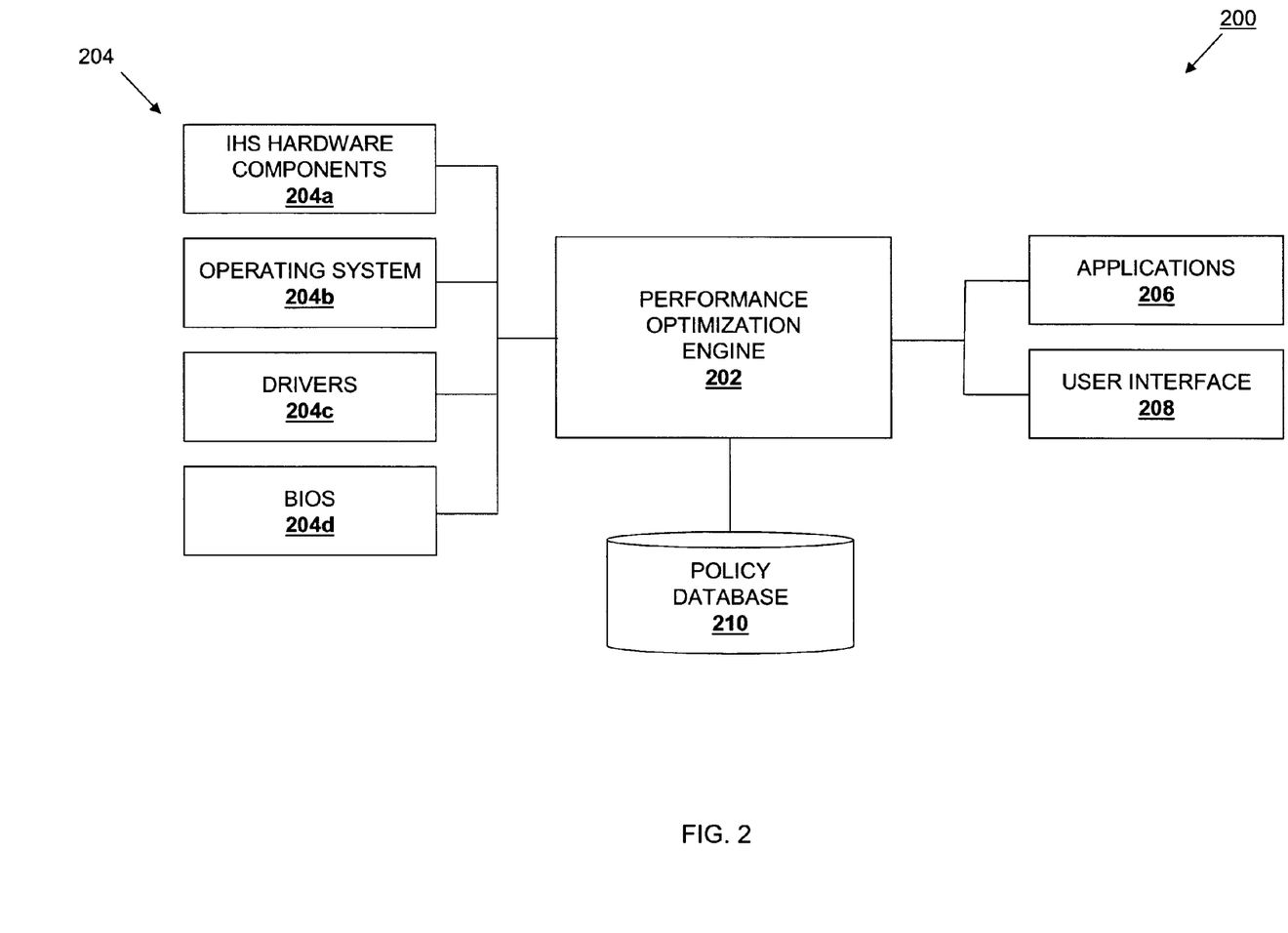
FIG. 2 is a schematic view illustrating an embodiment of a performance optimization system.

Referring now to FIG. 2, an embodiment of a performance optimization system 200 is illustrated. One of skill in the art will recognize that the performance optimization system 200 illustrated in FIG. 2 and described below provides an general overview of the performance optimization system of the present disclosure, and embodiments including specific details of the performance optimization system are illustrated and described with reference to other figures below. The performance optimization system 200 may be included in the IHS 100, discussed above with reference to FIG. 1. The performance optimization system 200 includes a performance optimization engine 202 that is coupled to a plurality of IHS platform subsystems 204, including IHS components 204a, an operating system 204b, drivers 204c, and a Basic Input-Output System (BIOS) 204d. The IHS components 204a may include a processor (e.g., the processor 102 discussed above with reference to FIG. 1), a memory (e.g., the system memory 114 discussed above with reference to FIG. 1), a storage (e.g., the mass storage device 108 discussed above with reference to FIG. 1), any of the other IHS components discussed above with reference to FIG. 1, a graphics processor, and/or a variety of other IHS components known in the art. The performance optimization engine 202 is also coupled to applications 206, a user interface 208, and a policy database 210. In an embodiment, the performance optimization engine 202 may be provided as a non-transitory, computer-readable medium that includes instructions that, when executed by a processor, cause the processor to perform the functions of the performance optimization engine 202, discussed below.

As discussed in further detail below, the performance optimization system 200 functions to optimize IHS performance by providing IHS platform information from the IHS platform subsystems 204 and usage information from the applications 206 and/or the user interface 208 to the performance optimization engine 202. IHS platform information may include configuration information (e.g., specific software and hardware settings, a number of processor cores, etc.), profiles, and/or a variety of other IHS platform information known in the art. Usage information may include utilization information (e.g., a processor utilization), activity information (a processor activity), and/or a variety of other usage information known in the art. The performance optimization engine 202 determines whether the IHS platform information and the usage information is associated with one or more policies in the policy database 210 and, if so, retrieves configuration information that that has been provided to optimize the configuration of the IHS platform subsystems 204 and/or the applications 206 when they are operating as detailed in the IHS platform information and the usage information. The configuration information may then be used to change the configuration of one or more of the IHS platform subsystems 204 and/or the applications 206 in order to optimize the performance of the system.

In an embodiment, a policy may include an action or actions that are taken when a trigger is detected (e.g., via the IHS platform information and/or the usage information). The trigger may include a set of parameters corresponding to one or more states of an IHS component. Policies may have priority settings such that, in the event multiple policies are triggered, a particular policy or policies may be implemented over others. Policies may also be implemented in parallel. Policies may be grouped together into profiles that provide a common performance objective for the system. For example, an IHS may include profiles for gaming, specific applications, etc. When implemented, the profiles allow the IHS to perform optimally during specific use cases for which the profiles may be created. Profiles may also have priority settings such that, in the event multiple profiles are triggered, a particular profile or profiles may be implemented over others. In some embodiments, profiles may also run in parallel.

For example, the performance optimization system 200 may be used with an application 206 that includes a computer aided drafting (CAD) application that is both processor and storage intensive. During operation of the CAD application, the performance optimization engine 202 may receive IHS platform information that includes, for example, that the processor and storage are both operating at a maximum level. The performance optimization engine 202 may then determine that a policy and/or a profile from the policy database 210 is associated with the CAD application and/or the processor and storage operating at a maximum level, and retrieve configuration information that is associated with that policy or profile and includes ensuring that the processor is in a multithreading mode and/or ensuring that an Advanced Host Controller Interface (AHCI) mode on a SATA controller coupled to the storage has been enabled so that command queuing/write back cache modes are enabled. The configuration information may then be used to change the configurations of the processor and/or the SATA controller by enabling the multithreading mode and AHCI mode if either have not been enabled. The configurations changes applied may also result in automatic changes to the BIOS. In some embodiments, the performance optimization engine 202 may send a recommendation to a user interface (e.g., a display screen) that in this example could include a recommendation for the user to purchase and/or unlock additional cores on the processor (e.g., for use when running the CAD application). Thus, the performance optimization system detects inputs from the system components and can make changes to the system configuration to optimize the performance of the system based on those inputs.

While an example of the performance optimization system optimizing a system for use with a CAD application is discussed above, one of skill in the art will recognize that the performance optimization system may be utilized to optimize the performance of the system in a variety of different use cases. For example, with a portable IHS, it may be important to monitor the utilization of the processor and storage and periodically reconfigure those components so that the battery life of the portable IHS can be optimized. In another example, with a gaming IHS, it may be important to monitor graphics utilization and periodically reconfigure the operation of the graphics processor to optimize the performance of the gaming IHS. In some embodiments, a user may manually select a profile in order to have the performance optimization engine implement the policies in that profile. In such an example, the performance optimization engine may implement the selected profile, retrieve IHS platform information and usage information used by the policies in the profile, and determine whether that information requires the configuration of the IHS platform subsystems 204 and/or applications 206 to be changed.

In some embodiments, the performance optimization engine may be operable to create a profile that optimizes the performance of an IHS during a specific use. Using the CAD application example above, a user running the CAD application may wish to optimize the performance of the IHS such that the CAD application runs as quickly as possible. The user may then instruct the performance optimization engine to create an application profile for the CAD application that provides for a maximum execution speed for the CAD application, which may be followed by the performance optimization engine monitoring the use of the CAD application and automatically determining what configurations and settings of the IHS components and the CAD application provide for maximum execution speed for the CAD application. The application profile may then be developed with multiple policies that change the configuration and/or settings of the IHS components and/or the CAD application as the CAD application is being used (e.g., the configuration and/or settings of the IHS components and/or the CAD application may change a first time for a first action performed using the CAD application, a second time for a section action performed using the CAD application, and so on.) Thus, profiles may be developed automatically using the performance optimization engine by having the performance optimization engine monitor a specific use of the IHS and develop a profile based on a desired performance of the IHS. The profiles automatically developed by the performance optimization engine may then be automatically applied whenever their associated use is detected (e.g., the application profile discussed above may be implemented in response to detecting the startup of the CAD application.)

Figure 3:
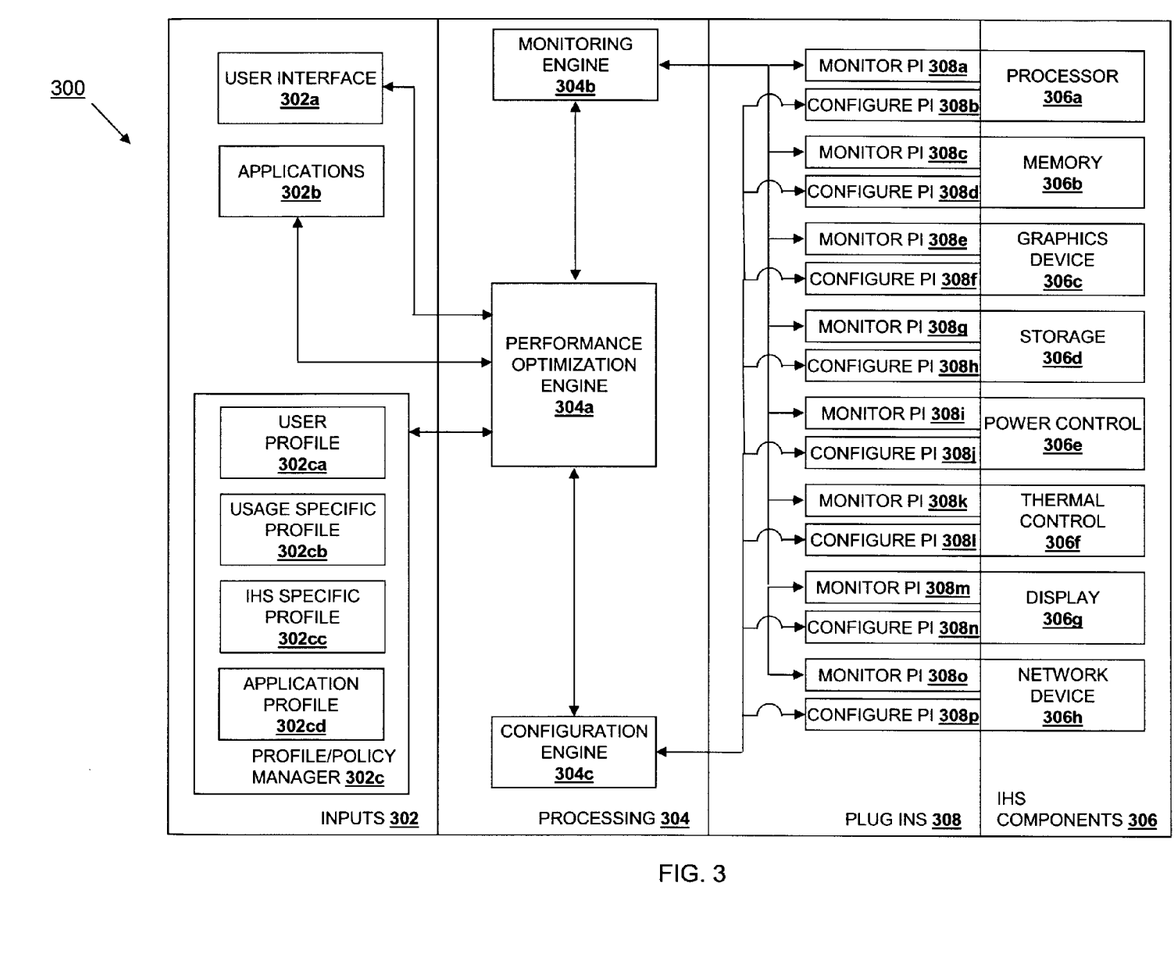
FIG. 3 is a schematic view illustrating an embodiment of a performance optimization system.

Referring now to FIG. 3, an embodiment of a performance optimization system 300 is illustrated that may include some or all of the components from the IHS 100, discussed above with reference to FIG. 1, and/or the performance optimization system 200, discussed above with reference to FIG. 2. One of skill in the art will recognize that, in some embodiments, the performance optimization system 300 provides a high level architectural view of the performance optimization system 200 of FIG. 2. The performance optimization system 300 includes an inputs component 302, a processing component 304, a plurality of IHS components 306, and a plug-ins component 308.

The inputs component 302 includes a user interface 302a, applications 302b, and a profile/policy manager 302c. In some embodiments, the user interface 302a may be the user interface 208, discussed above with reference to FIG. 2, the applications 302b may be the applications 206, discussed above with reference to FIG. 2, and the profile/policy manager 302c may be part of, or include part of, the policy database 210, discussed above with reference to FIG. 2. The profile/policy manager 302c includes a plurality of profiles such as, for example, one or more user profiles 302c a, one or more usage profiles 302c b, one or more IHS specific profiles 302c c, and one or more application profiles 302c d. In an embodiment, user profiles 302c a may include policies that provide for optimized performance for an IHS while providing desired characteristics defined by a user such as, for example, maximum battery life, maximum processing power, minimum system noise, etc. In an embodiment, usage profiles 302c b may include policies that provide for optimized performance for an IHS in response to specific uses of the IHS such as, for example, low power usage, high processor utilization, high storage utilization, etc. In an embodiment, IHS specific profiles 302c b may include policies that provide for optimized performance for specific IHSs such as, for example, one of a plurality of virtual IHSs provided on a physical IHS. In an embodiment, application profiles 302c b may include policies that provide for optimized performance for an IHS in response to the use of specific applications such as, for example, the CAD application use discussed above. While a few examples of profiles have been illustrated, one of skill in the art will recognize that a variety of different profiles may be provided by the profile/policy manager 302c while remaining within the scope of the present disclosure.

Using the user interface 302a and the profile/policy manager 302c, policies and profiles may be created. Upon the creation of a profile including one or more policies, the profile/policy manager may perform a check to determine whether any of the policies in the profile conflict and, if so, require the user resolve the conflict (e.g., assign a priorities to the conflicting policies) prior to allowing the profile to be stored for later execution.

The processing component 304 includes a performance optimization engine 304a that is coupled to a monitoring engine 304b and a configuration engine 304c. In some embodiments, the performance optimization engine 304a may be the performance optimization engine 202, discussed above with reference to FIG. 2. In an embodiment, the monitoring engine 304b and/or a configuration engine 304c may be provided as a non-transitory, computer-readable medium that includes instructions that, when executed by a processor, cause the processor to perform the functions of the monitoring engine 304b and a configuration engine 304c, discussed below. The performance optimization engine 304a is also coupled to the user interface 302a, the applications 302b, and the profile/policy management 302c.

The IHS components 306 include a processor 306a, a memory 306b, a graphics device 306c (e.g., a graphics processor), a storage 306d, a power control 306e, a thermal control 306f, a display 306g, and a network device 306h. The plug-ins component 308 include a monitoring plug-in (designated "monitor PI" in FIG. 3) and a configuration plug-in (designated "configure PI" in FIG. 3) for each of the IHS components 306a-h. Thus, a monitoring plug-in 308a and a configuration plug-in 308b are coupled to the processor 306a, a monitoring plug-in 308c and a configuration plug-in 308d are coupled to the memory 306b, a monitoring plug-in 308e and a configuration plug-in 308f are coupled to the graphics device 306c, a monitoring plug-in 308g and a configuration plug-in 308h are coupled to the storage 306d, a monitoring plug-in 308i and a configuration plug-in 308j are coupled to the power control 306e, a monitoring plug-in 308k and a configuration plug-in 308l are coupled to the thermal control 306f, a monitoring plug-in 308m and a configuration plug-in 308n are coupled to the display 306g, and a monitoring plug-in 308o and a configuration plug-in 308p are coupled to the network device 306h. Each of the monitoring plug-ins 308a, 308c, 308e, 308g, 308i, 308k, 308m, and 308o are coupled to the monitoring engine 304b. Each of the configuration plug-ins 308b, 308d, 308f, 308h, 308j, 308l, 308n, and 308p are coupled to the configuration engine 304c.

In an embodiment, the use of the monitoring plug-ins and configuration plug-ins provide the ability to optimize the performance of systems having components from different vendors. For example, modifying a graphics processor clock for optimal graphics processor performance will require different programming for a first vendor's graphics processor than is required for a second vendor's graphics processor.

Thus, monitoring plug-in and configuration plug-in may be developed for new hardware that is created for a system, allowing the monitoring and optimization discussed below. For example, the monitoring plug-ins and configuration plug-ins may have a defined Application Programming Interface (API) that may be provided to hardware and software vendors for use in creating monitoring plug-ins and configuration plug-ins that operate with their hardware and/or software.

Figure 4:
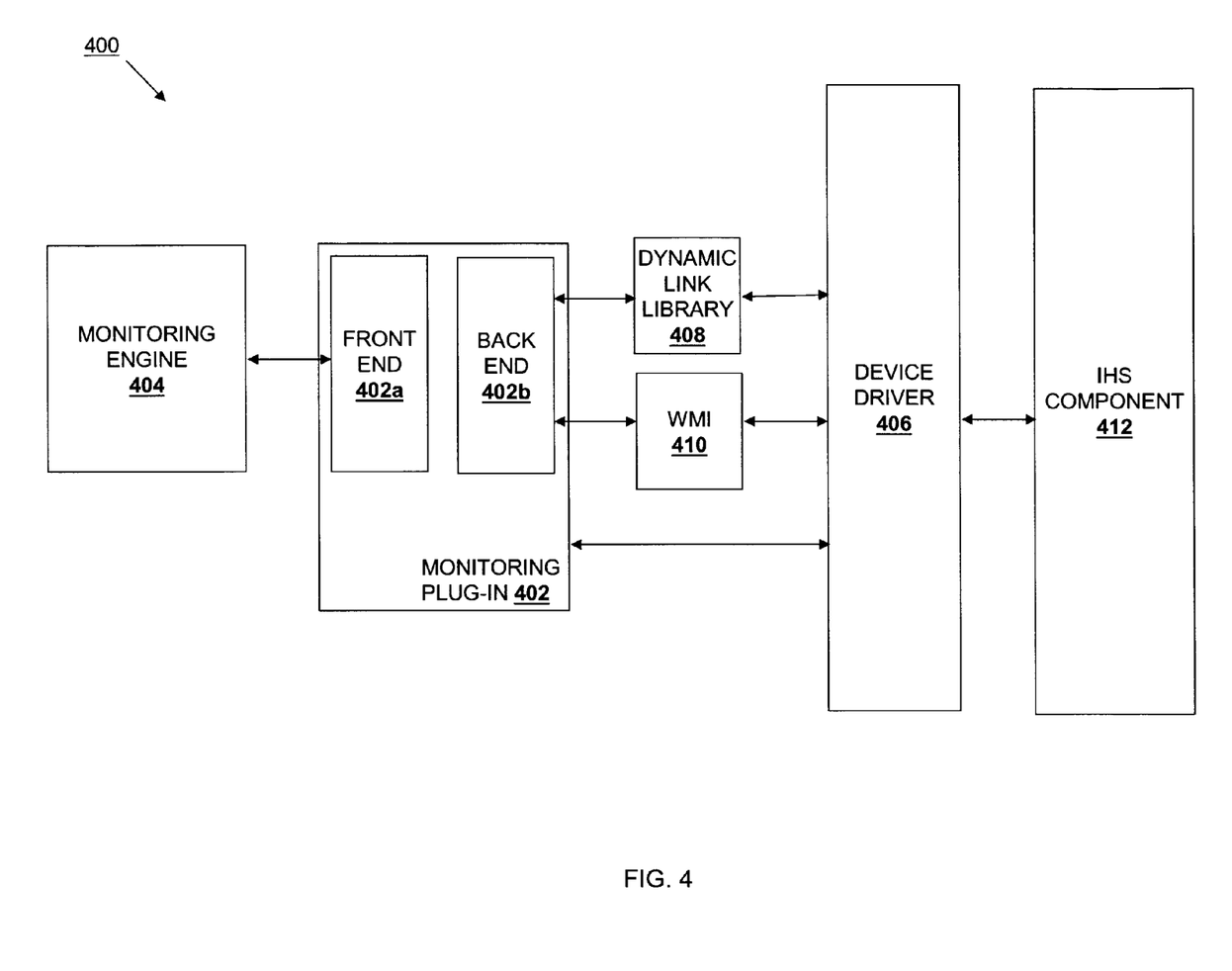
FIG. 4 is a schematic view illustrating an embodiment of a monitoring plug-in in the performance optimization system of FIG. 3.

Referring now to FIG. 4, an embodiment of the coupling 400 of a monitoring plug-in to a monitoring engine and an IHS component is illustrated. A monitoring plug-in 402, which may be any of the monitoring plug-ins 308a, 308c, 308e, 308g, 308i, 308k, 308m, and 308o discussed above with reference to FIG. 3, is coupled to a monitoring engine 404, which may be the monitoring engine 304b discussed above with reference to FIG. 3, through a front end 402a that provides an interface between the monitoring plug-in 402 and the monitoring engine 404. The monitoring plug-in 402 may be coupled to a device driver 406 directly, as well as through a dynamic link library 408 and a Windows® Management Instrumentation 410 via a back end 402b that includes subsystem specific code. The subsystem specific code may include code in the plug-in that is unique to a particular device associated with that plug-in (e.g., code unique to a processor may be provided in a plug-in to extract core utilization data, while code unique to a storage device may be provided to extract queue depth data.) The device driver 406 is coupled to an IHS component 412 that may be one of the IHS components 306 discussed above with reference to FIG. 3. In an embodiment, the monitoring plug-in 402 is operable to monitor the IHS component 412 by monitoring device driver parameters of the device driver 406. One of skill in the art will recognize that the plug-ins provide a stand mechanism (e.g., the API) that allows the monitoring engine 304b to communicate with device drivers from a variety of suppliers.

In an embodiment, the monitoring plug-ins provide for monitoring parameter enumeration and monitoring parameter reporting. Because the monitoring parameters will be specific to the IHS component, a monitoring plug-in API may provide a mechanism for that IHS component to report to the monitoring engine 304b and the performance optimization engine 304a a variety of information for a monitoring parameter such as, for example, a name of the monitoring parameter, a query type for the monitoring parameter (i.e., how the monitoring parameter is to be read, e.g., real time, callback or interrupt driven, etc.), a minimum polling time for the monitoring parameter, a parameter type (e.g., a data type such as INT64, BOOL, STRING, etc.), a parameter range (e.g., the upper and lower bounds of the parameter value), and/or a list of selectable values for the monitoring parameter. In one example, if the query type for the monitoring parameter is real time, then the minimum polling time for the monitoring parameter will define the amount of time that must elapse before another read of the same monitoring parameter should be performed. In another example, if the query type for the monitoring parameter is callback or interrupt driven, the monitoring plug-in may call a callback function in the monitoring engine when there is a change in the monitoring parameter. An example of monitoring parameter information reportable by a monitoring plug-in for an Engineering application might include a name of the monitoring parameter being "Rendering Computations", a query type for the monitoring parameter being "callback", a minimum polling time for the monitoring parameter being "not applicable", a parameter type being "STRING", a parameter range being "Low to High", and/or a list of selectable values for the monitoring parameter being "Low, Medium, High". In an embodiment, the policies discussed above may be at least partially defined based on and/or associated with the monitoring parameter names and upper and lower bounds.

Figure 5:
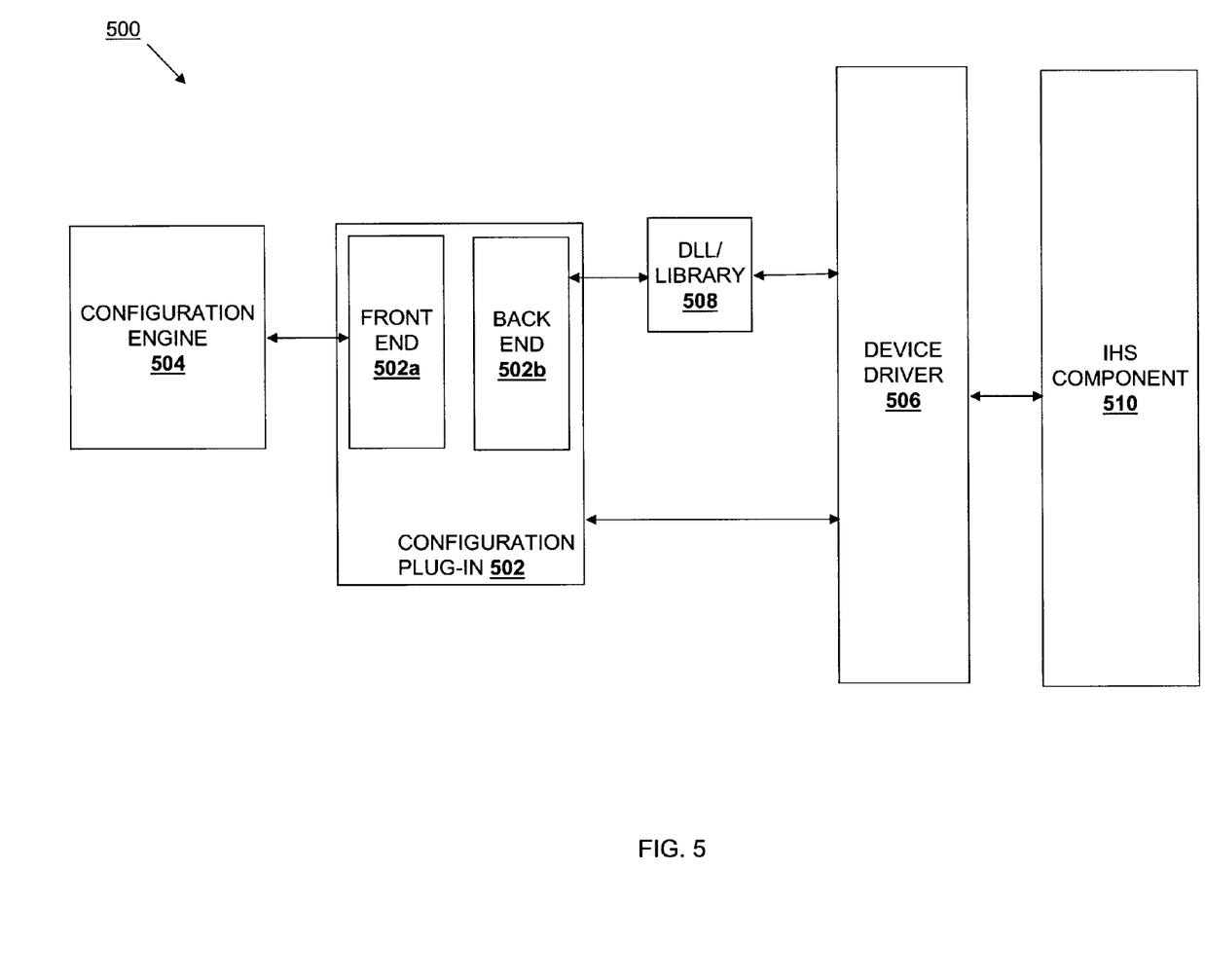
FIG. 5 is a schematic view illustrating an embodiment of a configuration plug-in in the performance optimization system of FIG. 3.

Referring now to FIG. 5, an embodiment of the coupling 400 of a configuration plug-in to a monitoring engine and an IHS component is illustrated. A configuration plug-in 502, which may be any of the configuration plug-ins 308b, 308d, 308f, 308h, 308j, 308l, 308n, and 308p discussed above with reference to FIG. 3, is coupled to a configuration engine 504, which may be the configuration engine 304c discussed above with reference to FIG. 3, through a front end 502a that provides an interface between the configuration plug-in 502 and the configuration engine 504. The configuration plug-in 502 is coupled to a device driver 506 directly, as well as through a dynamic link library 508 via a back end 502b that includes subsystem specific code. The subsystem specific code may include code in the plug-in that is unique to a particular device associated with that plug-in (e.g., code unique to a processor may be provided in a plug-in to allow the disabling of a turbo mode, while code unique to a thermal control device may be provided to allow for increase in fan speed.) The device driver 506 is coupled to an IHS component 510 that may be one of the IHS components 306 discussed above with reference to FIG. 3. In an embodiment, the configuration plug-in 502 is operable to configure and/or control the IHS component 510 by configuring or controlling device driver parameters of the device driver 406. One of skill in the art will recognize that the plug-ins provide a stand mechanism (e.g., the API) that allows the configuration engine 304c to communicate with device drivers from a variety of suppliers.

In an embodiment, the configuration plug-ins provide for configuration enumeration and component configuration settings. Because the component configuration settings will be specific to the IHS component, a configuration plug-in API may provide a mechanism for that IHS component to report to the configuration engine 304b and the performance optimization engine 304a a variety of information for a configuration parameter such as, for example, a name of the configuration parameter, configuration latency (e.g., the amount of time it will take to set the configuration), a parameter type (e.g., a data type such as INT64, BOOL, STRING, etc.), a parameter range (e.g., the upper and lower bounds of the parameter value), a list of selectable values for the configuration parameter, and/or a parameter flag (e.g., a flag used to indicate any special handling of a specific parameter such as, for example, a required system reboot when a parameter has changed.) An example of configuration parameter information reportable by a configuration plug-in might include a name of the configuration parameter being "Device Clock", a configuration latency being "0", a parameter type being "INT", a parameter range being "N/A", a list of selectable values for the configuration parameter being "550 Mhz, 1010 Mhz, 1300 Mhz, 1625 Mhz, 1975 Mhz", and a parameter flag being "none". In an embodiment, the policies discussed above may be at least partially defined based on and/or associated with the output setting parameter names, upper and lower bounds, and selectable values.

In an embodiment, the performance optimization engine 304a receives monitoring plug-in monitoring parameters and, if a specified trigger is detected, a policy may be retrieved that provides one or more configuration parameters that are provided to the configuration plug-ins. In another embodiment, a profile may be loaded by the performance optimization engine 304a, and for each policy in the profile, a separate execution thread may be created that runs a policy function and then waits an amount of time specified in the profile for the polling interval for that policy function. After the wait time has elapsed, the policy function may be called again. This may be repeated until a different profile is loaded by the performance optimization engine 304a. In utilizing separate execution threads for the policies, policies in a profile may be executed in parallel. Priorities assigned to various policies in a profile may be used when a conflict is detected between two policies in the same profile (a user may be forced to assign priorities to policies in the event of a conflict to create a policy hierarchy.) Similarly, profiles may be assigned priorities that may be used by the performance optimization engine 304a to resolve conflicts by executing policies from the profile with higher priority.

Furthermore, as discussed in further detail below, the performance optimization system may allow for optimizing the performance of the system for an application that is being run. An API may be provided to Independent Software Vendors (ISVs) so that the ISVs may create applications that can be monitored and/or have their application parameters adjusted such that the system performs optimally in the running of that application. In an embodiment, performance policies for the system may be retrieved over a network from a location that is remote from the system (e.g., a $3^{rd}$ party application provided by the ISV, a general database, etc.) on a periodic basic that may be automated, in response to an instruction by a user, etc.

Figure 6:
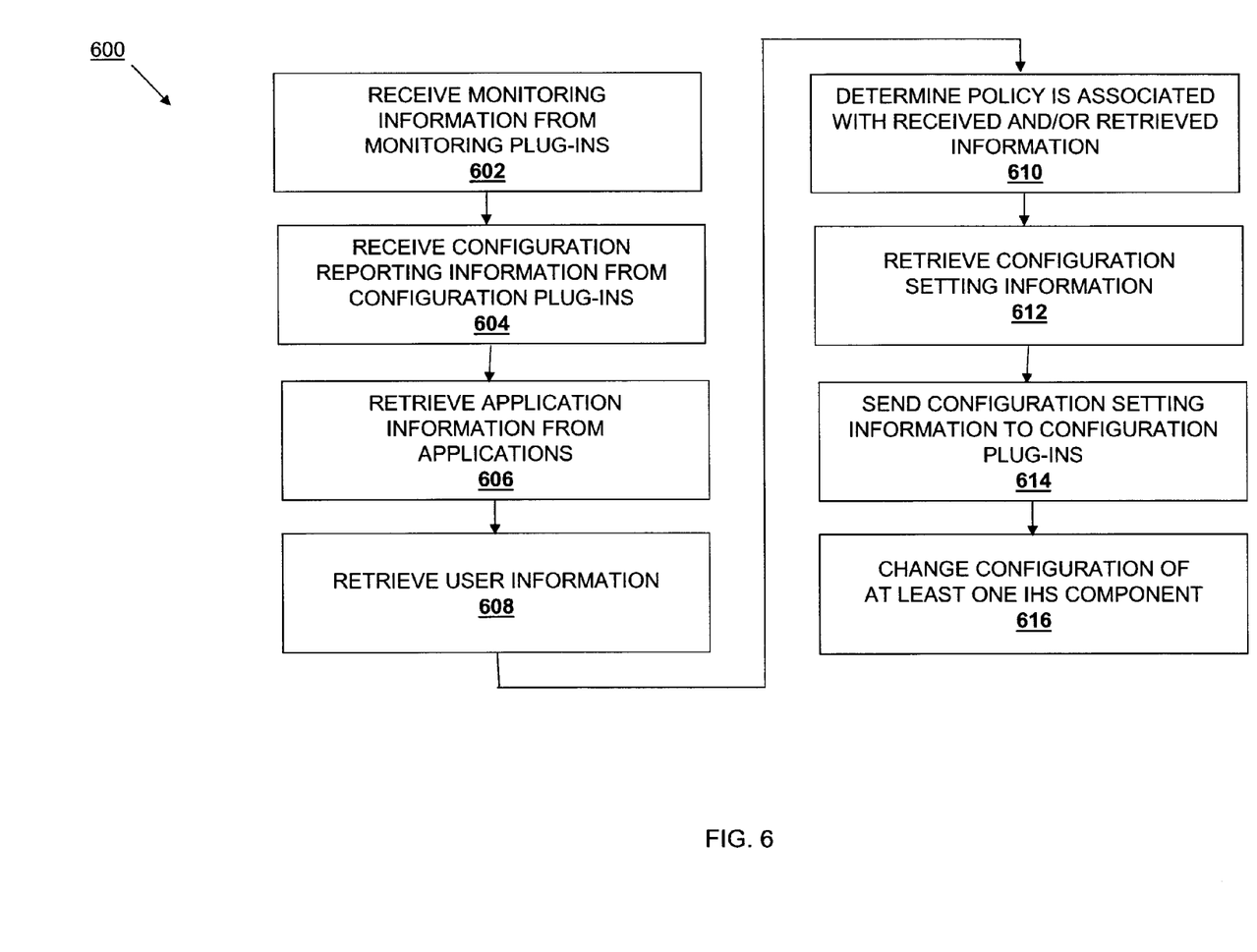
FIG. 6 is a flow chart illustrating an embodiment of a method for optimizing the performance of an information handling system.

Referring now to FIGS. 3 and 6, a method 600 for optimizing the performance of an IHS is illustrated. The method 600 begins at block 602 where monitoring information is received from one or more monitoring plug-ins. In an embodiment, the monitoring engine 304b receives monitoring information for at least one of the IHS components 306 from the IHS component's respective monitoring plug-in 308a, 308c, 308e, 308g, 308i, 308k, 308m, and/or 308o and sends the monitoring information to the performance optimization engine 304a. As discussed above, in some embodiments, each of the monitoring plug-ins 308a, 308c, 308e, 308g, 308i, 308k, 308m, and/or 308o may be operable to report monitoring parameters that provide monitoring information about their respective IHS component 306. In some cases, the monitoring information may be reported in response to a trigger being detected due to the monitoring parameter reaching or exceeding a predetermined threshold. While a specific embodiment of the provision and receipt of monitoring information has been described, the present disclosure is not so limited. For example, while the provision of monitoring information has been described above as the provision of monitoring parameters in response to the monitoring plug-in determining a trigger has been detected, in other embodiments, the monitoring plug-ins may provide the monitoring information to the monitoring engine 304b and the monitoring engine 304b may determine whether a trigger is detected, or the monitoring plug-ins may provide the monitoring information to the performance optimization engine 304a and the performance optimization engine 304a may then determine whether that monitoring information is associated with a policy, as discussed in further detail below.

The method 600 then proceeds to block 604 where configuration reporting information is received from one or more of the configuration plug-ins. In an embodiment, the configuration engine 304c receives configuration reporting information for at least one of the IHS components 306 from the IHS component's respective configuration plug-in 308b, 308d, 308f, 308h, 308j, 308l, 308n, and/or 308p, and sends the configuration information to the performance optimization engine 304a. As discussed above, in some embodiments, each of the configuration plug-ins 308b, 308d, 308f, 308h, 308j, 308l, 308n, and 308p may be operable to report configuration parameters that provide configuration reporting information about their respective IHS component 306. In some cases, configuration reporting information provides the configuration engine 304c and the performance optimization engine 304a with the current configuration of each of the IHS components 306.

The method 600 then proceeds to block 606 where application information is retrieved for one or more applications. In an embodiment, the performance optimization engine 304a retrieves application information for one or more of the applications 302b. For example, application information may include the values of a plurality of current application parameters, an indication of an impending application action, and/or a variety of other application information known in the art. Applications may be input/output (I/O) intensive, compute intensive, etc., and the application information may reflect that.

The method 600 then proceeds to block 608 where user information is retrieved. In an embodiment, the performance optimization engine 304a retrieves user information from, for example, a user through the user interface 302a. For example, user information may include a user name and password that allows the performance optimization engine 304a to retrieve other user information such as, for example, a user profile. A user profile may provide for a variety of configurations and/or settings for the IHS components in order to achieve a desired performance of an IHS such as, for example, long battery life, maximum processing power, minimal noise, etc.

The method 600 then proceeds to block 610 where it is determined that a policy is associated with the information received and/or retrieved in blocks 602, 604, 606, and 608 of the method 600. In an embodiment, the performance optimization engine 304a uses the monitoring information received in block 602 of the method 600, the configuration reporting information received in block 604 of the method 600, the application information retrieved in block 606 of the method 600, and/or the user information retrieved in block 608 of the method 600, and determines that one or more policies are associated with the received and/or retrieved information. As discussed below, some embodiments of the performance optimization system may operate using only some of the information received and/or retrieved in blocks 602, 604, 606, and 608 of the method 600. In those embodiments, the blocks that include the receipt or retrieval of information that is not used may be omitted. While a few examples of block 610 of the method 600 are provided below to demonstrate this, those examples should not be interpreted to limit the present disclosure, as any combinations of the information received and/or retrieved at blocks 602, 604, 606, and 608 of the method 600 are envisioned as falling within the scope of the present disclosure.

In one embodiment, the performance optimization engine 304a may use the monitoring information received in block 602 of the method 600 and the configuration reporting information received in block 604 of the method 600 in determining a policy at block 610 of the method 600. For example, the configuration reporting information may provide the performance optimization engine 304a with the current configuration of the IHS components 306 while the monitoring information may provide the performance optimization engine 304a with the current operation of the IHS components 306. The performance optimization engine 304a may review the profiles and/or policies using the configuration reporting information and the monitoring information to determine the profiles and/or policies that are associated with that configuration reporting information and monitoring information.

Thus, profiles and/or policies are determined that are associated with the current configuration and current operation of the IHS components.

In another embodiment, the performance optimization engine 304a may use the monitoring information received in block 602 of the method 600 and the application information retrieved in block 606 of the method 600 in determining a policy at block 610 of the method 600. For example, the application information may provide the performance optimization engine 304a with the current parameters and/or impending actions of one or more applications, while the monitoring information may provide the performance optimization engine 304a with the current operation of the IHS components 306. The performance optimization engine 304a may review the profiles and/or policies using the application information and the monitoring information to determine the profiles and/or policies that are associated with that application information and monitoring information. Thus, profiles and/or policies are determined that are associated with the current operation of the IHS component along with the current parameters and/or impending actions of one or more applications.

In another embodiment, the performance optimization engine 304a may use the monitoring information received in block 602 of the method 600 and the user information received in block 608 of the method 600 in determining a policy at block 610 of the method 600. For example, the user information may provide the performance optimization engine 304a with the current user of the system while the monitoring information may provide the performance optimization engine 304a with the current operation of the IHS components 306. The performance optimization engine 304a may review the profiles and/or policies using the user information and the monitoring information to determine the profiles and/or policies that are associated with that user information and monitoring information. Thus, profiles and/or policies are determined that are associated with the current operation of the IHS components and the user using the system.

In other embodiments, the different information received and/or retrieved in blocks 602, 604, 606, and 608 may be used at the same time to determine a policy to implement, or may be used separately as system conditions change. For example, the performance optimization engine 304a may initially use monitoring information and configuration reporting information in determining a policy at block 610 of the method 600. A user may then log into the system by providing user information, and the performance optimization engine 304a may use monitoring information, the configuration reporting information, and the user information to determine a new policy. The user may then start an application and provide application information, and the performance optimization engine 304a may use monitoring information, the configuration reporting information, the user information, and the application information to determine a new policy.

The method 600 then proceeds to block 612 where configuration setting information is retrieved. In an embodiment, each policy is associated with configuration setting information. Thus, using the profiles and/or policies determined to be associated with the received and/or retrieved information in block 610, the performance optimization engine 304a may retrieve the configuration setting information associated with the determined profiles and/or policies. In an embodiment, the configuration settings information includes configuration parameters for one or more of the IHS components 306. As discussed above, in some embodiments, the configuration plug-ins can communicate information using configuration parameters that may include a list of selectable values for the configuration parameter, and the configuration settings information may include a selection from the list of selectable values for the configuration parameter. In other embodiments, the configurations setting information may include any information that may be communicated to the configuration plug-ins in order to set the configuration of the IHS components 306 according to the profile and/or policy determined in block 610 of the method 600.

The method 600 then proceeds to block 614 where configuration information is sent to one or more configuration plug-ins, and block 616 where the configuration of at least one IHS component is changed. In an embodiment, the performance optimization engine 304a sends the configuration setting information retrieved in block 612 of the method 600 to the configuration engine 304b, and the configuration engine 304b provides the configuration information (or portions of the configuration information) to the appropriate configuration plug-ins. As discussed above, the configuration settings information may include a selection from the list of selectable values for the configuration parameter communicated by the configuration plug-ins, and the configuration plug-ins are operable to use the selection to change the configuration of at least one of the IHS components. For example, the selection from the list of selectable values for the configuration parameter may include a selection of an available performance state (P-state) for the processor 306a, and that selection may be communicated to the configuration plug-in 308b, which then uses the selection to change the configuration of the processor 306a by changing the P-state of the processor 306a. In another example, the selection from the list of selectable values for the configuration parameter may include an enablement of a "turbo mode" for the processor 306a, and that selection may be communicated to the configuration plug-in 308b, which then uses the selection to change the configuration of the processor 306a by enabling the "turbo mode" of the processor 306a. One of skill in the art will recognize that the configuration of any, all, or any combination of the IHS components may be changed by providing configuration setting information to the configuration plug-ins.

Returning to the example discussed above, a CAD application may inform the performance optimization engine 304a that it is about to perform a graphics intensive rendering operation (e.g., provide application information including an impending action by the application), and the performance optimization engine 304a may then determine that a policy is associated with such a graphics-intensive rendering operation, determine that configuration setting information is associated with that policy that includes increasing the graphics processor clock to a maximum performance level, and that configuration setting information may be provided to the configuration plug-in 308f to change the configuration of the graphics processor 306c.

In an embodiment, the information received and retrieved in blocks 602, 604, 606, and 608 may be used for purposes other than determining an associated policy. For example, the performance optimization engine 304a may determine a user recommendation using the monitoring information received in block 602 of the method and the configuration reporting information received in block 604 of the method 600. In response to determining a user recommendation, the performance optimization engine 304a may send the user recommendation to the user interface 302a. For example, the monitoring information and the configuration reporting information provides the current configuration and operation of the system, and may indicate to the performance optimization engine 304a that the system would benefit from unlocking additional cores in the processor. Thus, using the monitoring information and the configuration reporting information, a user recommendation could be displayed to the user suggesting that the user purchase and unlock additional cores in the processor. In another example, the information received and retrieved in blocks 602, 604, 606, and 608 may be used by the performance optimization engine 304a to determine that at least one application parameter change should be made to an application (e.g., application parameters changes may include a change to run-time and/or application settings (e.g., run-time data set size) in an application depending on, for example, the system hardware.) In an embodiment, application parameter changes may be associated with the policy determined in block 610 of the method 600. In response to determining that at least one application parameter change should be made to an application, the performance optimization engine 304a may send the at least one application parameter change to the application in order to change at least one application parameter of the application.

In an embodiment, the blocks 602, 604, 606, and 608 may be performed by the performance optimization system in parallel. Furthermore, the method 600 may be performed continuously such that the performance optimization system continually monitors for predefined triggers that will result the application of system component settings to optimize component utilization. In an embodiment, the performance optimization system may apply a compare function that compares the current system settings that indicate a current state of the system with a desired system state having system optimized settings. In some cases, a trigger may occur and the system will already include the optimized settings such that no action will need to be taken (e.g., in response to detecting a trigger, if the desired settings equal the current settings, the system takes no action), while in other cases the system settings will need to be changed to the optimized settings (e.g., in response to detecting a trigger, if the desired settings do not equal the current settings, the system takes action to change the settings to the optimized settings.)

Thus, a performance optimization system and method have been described that determine the configuration of IHS subsystems, monitor the hardware, software, and other devices in the IHS, recommend user actions to be performed on the IHS, and dynamically adjust hardware and software settings and parameters to provide for the optimal performance for the IHS based on the current configuration and usage of the IHS. One of skill in the art will recognize that such a system is operable to repeatedly change the configuration and settings of applications and IHS components in the IHS as the usage of the IHS changes, the usage of applications change, and the user of the IHS changes. Profiles and policies that provide the performance optimized configuration settings information and/or application parameters for a particular use of the IHS may be provided by the IHS manufacturer, created by the user, and/or automatically created by the performance optimization system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A performance optimization system, comprising:
   a plurality of system components that are configured to provide an application;
   a monitoring plug-in and a configuration plug-in coupled to each of the plurality of system components;
   a monitoring engine coupled to each monitoring plug-in, wherein the monitoring engine is configured to receive monitoring information for each of the plurality of system components from the monitoring plug-ins;
   a configuration engine coupled to each configuration plug-in, wherein the configuration engine is configured to send configuration setting information to each of the plurality of system components through the configuration plug-ins; and
   a performance optimization engine coupled to the monitoring engine and the configuration engine, wherein the performance optimization engine is configured to retrieve application information from the application, receive the monitoring information from the monitoring engine, determine a policy is associated with both the monitoring information and the application information and, in response, retrieve configuration setting information that is associated with the policy and send the configuration setting information to the configuration engine in order to change the configuration of at least one of the plurality of system components according to the application information.

2. The system of claim 1, wherein the configuration engine is configured to retrieve configuration reporting information for each of the plurality of system components from the configuration plug-ins, and wherein the performance optimization engine is configured to determine the policy is associated with both the monitoring information and the configuration reporting information and, in response, retrieve and send the configuration setting information that is associated with the policy to the configuration engine.

3. The system of claim 2, wherein the performance optimization engine is configured to determine a user recommendation using the monitoring information and the configuration reporting information and, in response, send the user recommendation to a user interface.

4. The system of claim 1, wherein the changing the configuration of at least one of the plurality of system components according to the application information is configured to provide a maximum execution speed for the application.

5. The system of claim 1, wherein the performance optimization engine is configured to determine that at least one application parameter change is associated with the policy and, in response, send the at least one application parameter change to the application in order to change at least one application parameter of the application.

6. The system of claim 1, wherein the performance optimization engine is configured to retrieve user information, and wherein the performance optimization engine is configured to determine the policy is associated with both the monitoring information and the user information and, in response, retrieve and send the configuration setting information that is associated with the policy to the configuration engine in order to change the configuration of at least one of the plurality of system components according to the user information.

7. The system of claim 1, wherein the performance optimization engine is configured to determine a profile, that includes a plurality of policies, is associated with the monitoring information and, in response, retrieve configuration setting information that is associated with the plurality of policies in the profile and send the configuration setting information to the configuration engine in order to change the configuration of at least one of the plurality of system components.

8. An information handling system (IHS), comprising:
an IHS chassis;
a plurality of IHS components, including a processor, that are located in the IHS chassis and configured to provide an application;
a monitoring plug-in and a configuration plug-in coupled to the processor;
a monitoring engine coupled to the monitoring plug-in, wherein the monitoring engine is configured to receive monitoring information for the processor from the monitoring plug-in;
a configuration engine coupled to the configuration plug-in, wherein the configuration engine is configured to send configuration setting information to processor through the configuration plug-ins; and
a performance optimization engine coupled to the monitoring engine and the configuration engine, wherein the performance optimization engine is configured to retrieve application from the application, receive the monitoring information from the monitoring engine, determine a policy is associated with both the monitoring information and the application information and, in response, retrieve configuration setting information that is associated with the policy and send the configuration setting information to the configuration engine in order to change the configuration of the processor according to the application information.

9. The IHS of claim 8, wherein the configuration engine is configured to retrieve configuration reporting information for the processor from the configuration plug-in, and wherein the performance optimization engine is configured to determine the policy is associated with both the monitoring information and the configuration reporting information and, in response, retrieve and send the configuration setting information that is associated with the policy to the configuration engine.

10. The IHS of claim 9, wherein the performance optimization engine is configured to determine a user recommendation using the monitoring information and the configuration reporting information and, in response, send the user recommendation to a user interface.

11. The IHS of claim 8, wherein the changing the configuration of the processor according to the application is configured to provide a maximum execution speed for the application.

12. The IHS of claim 8, wherein the performance optimization engine is configured to determine that at least one application parameter change is associated with the policy and, in response, send the at least one application parameter change to the application in order to change at least one application parameter of the application.

13. The IHS of claim 8, wherein the performance optimization engine is configured to retrieve user information, and wherein the performance optimization engine is configured to determine the policy is associated with both the monitoring information and the user information and, in response, retrieve and send the configuration setting information that is associated with the policy to the configuration engine in order to change the configuration of the processor according to the user information.

14. The IHS of claim 8, wherein the performance optimization engine is configured to determine a profile, that includes a plurality of policies, is associated with the monitoring information and, in response, retrieve configuration setting information that is associated with the plurality of policies in the profile and send the configuration setting information to the configuration engine in order to change the configuration of processor.

15. A method for optimizing the performance of an information handling system (IHS), comprising:
providing a monitoring plug-in and a configuration plug-in coupled to each of a plurality of IHS components that provide an application;
receiving monitoring information for the plurality of IHS components from the monitoring plug-ins;
retrieving application information from the application;
determining a policy is associated with both the monitoring information and the application information;
retrieving configuration setting information that is associated with the policy in response to determining that the policy is associated with both the monitoring information and the application information; and
sending the configuration setting information to at least one of the configuration plug-ins in order to change the configuration of at least one of the plurality of IHS components according to the application information.

16. The method of claim 15, further comprising:
retrieving configuration reporting information for each of the plurality of IHS components from the configuration plug-ins;
determining the policy is associated with both the monitoring information and the configuration reporting information; and
retrieving and sending the configuration setting information that is associated with the policy to the at least one of the configuration plug-ins in response to determining that the policy is associated with the monitoring information and the configuration reporting information.

17. The method of claim 16, further comprising:
determining a user recommendation using the monitoring information and the configuration reporting information and, in response, sending the user recommendation to a user interface.

18. The method of claim 15, where the changing the configuration of at least one of the plurality of IHS components according to the application information provides a maximum execution speed for the application.

19. The method of claim 15, further comprising:
determining that at least one application parameter change is associated with the policy and, in response, sending the at least one application parameter change to the application in order to change at least one application parameter of the application.

20. The method of claim 15, further comprising:
retrieving user information;
determining the policy is associated with both the monitoring information and the user information; and
retrieving and sending the configuration setting information that is associated with the policy to the at least one configuration plug-in in order to change the configuration of at least one of the plurality of IHS components according to the user information.

* * * * *